(12) United States Patent
Zhou et al.

(10) Patent No.: US 10,895,248 B2
(45) Date of Patent: Jan. 19, 2021

(54) GEOTHERMAL ENERGY SYSTEM AND METHOD OF PRODUCING POWER USING SAME

(71) Applicants: Kang Zhou, Hangzhou (CN); Hassan Jafari, Tehran (IR)

(72) Inventors: Kang Zhou, Hangzhou (CN); Hassan Jafari, Tehran (IR)

( * ) Notice: Subject to any disclaimer, the term of this patent is extended or adjusted under 35 U.S.C. 154(b) by 0 days.

(21) Appl. No.: 16/894,677

(22) Filed: Jun. 5, 2020

(65) Prior Publication Data

US 2020/0300231 A1 Sep. 24, 2020

Related U.S. Application Data

(63) Continuation-in-part of application No. PCT/IB2018/001575, filed on Dec. 13, 2018.

(60) Provisional application No. 62/598,026, filed on Dec. 13, 2017.

(51) Int. Cl.
*F03G 7/04* (2006.01)
*F01K 7/16* (2006.01)

(52) U.S. Cl.
CPC . *F03G 7/04* (2013.01); *F01K 7/16* (2013.01)

(58) Field of Classification Search
CPC ................ F03G 7/00; F03G 7/04; F01K 7/16
See application file for complete search history.

(56) References Cited

U.S. PATENT DOCUMENTS

| | | | | |
|---|---|---|---|---|
| 3,509,716 A | * | 5/1970 | Avery | F03G 3/00 60/675 |
| 4,570,444 A | * | 2/1986 | Gould | F03G 3/00 60/531 |
| 5,038,567 A | * | 8/1991 | Mortiz | F03G 7/04 60/641.5 |
| 6,892,539 B2 | * | 5/2005 | Jarman | F01K 7/00 60/641.8 |
| 9,745,899 B2 | | 8/2017 | Wright et al. | |
| 2010/0269540 A1 | * | 10/2010 | Rush | F03B 13/00 62/606 |
| 2011/0072819 A1 | | 3/2011 | Silva et al. | |

(Continued)

FOREIGN PATENT DOCUMENTS

| | | |
|---|---|---|
| CA | 2744404 A1 | 12/2012 |
| CN | 1582366 A | 2/2005 |

(Continued)

*Primary Examiner* — Shafiq Mian

(57) ABSTRACT

A geothermal energy system utilizes a Catherine Wheel that spins around an axle to produce power. The Catherine Wheel has a plurality of wheel arms extending radially out from the axle. A fin portion extends from the radial portion at an offset angle, to an exhaust end. A first working fluid, such as supercritical carbon dioxide flows through an arm conduit within the wheel arm and second working fluid, such as a simply hydrocarbon mixes with the first working fluid and both flow through a turbine. The turbine is configured within the wheel arm conduit and it turns as the combined working fluids vaporize. The fluids are expelled and the second working fluid may be condensed and recirculated while the first working fluid may be expelled back into a geothermal reservoir. The geothermal energy system efficiently and effectively produces power by using geothermal energy to vaporize a hydrocarbon.

19 Claims, 8 Drawing Sheets

(56) References Cited

U.S. PATENT DOCUMENTS

| | | | | |
|---|---|---|---|---|
| 2012/0111010 A1* | 5/2012 | Geldon | ................. | F03G 7/00 |
| | | | | 60/721 |
| 2012/0213641 A1* | 8/2012 | Lin | ................. | F03G 7/00 |
| | | | | 416/227 R |
| 2013/0043678 A1* | 2/2013 | Saar | ................. | F02C 1/005 |
| | | | | 290/2 |
| 2018/0238296 A1* | 8/2018 | Wolfe | ................. | F03G 7/00 |

FOREIGN PATENT DOCUMENTS

| | | |
|---|---|---|
| CN | 203626908 U | 6/2014 |
| CN | 104870759 A | 8/2015 |

\* cited by examiner

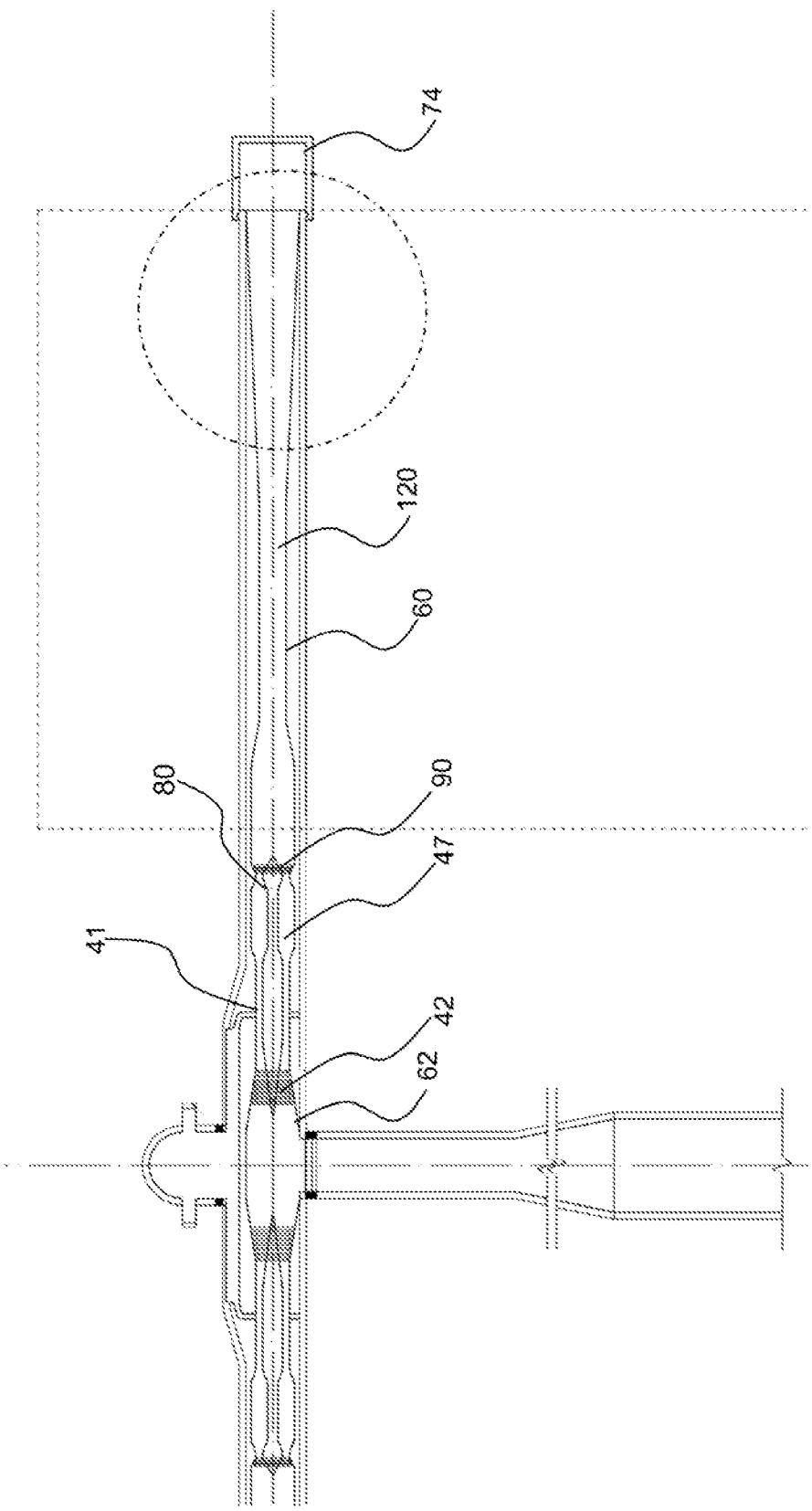

GEOTHERMAL ENERGY SYSTEM AND METHOD OF PRODUCING POWER USING SAME

CROSS REFERENCE TO RELATED APPLICATIONS

This application is a continuation in part of PCT/IB2018/001575, filed on Dec. 13, 2018, which claims the benefit of priority to U.S. provisional patent application No. 62/598,026, filed on Dec. 13, 2017 and entitled Geothermal Energy System And Method Of Producing Power Using Same; the entirety of both of which are hereby incorporated by reference herein.

BACKGROUND OF THE INVENTION

Field of the Invention

The invention related to geothermal energy systems particularly to a geothermal energy system incorporating a Catherine Wheel.

Background

In the past design of the configuration of a carbon dioxide based Enhanced/Engineered Geothermal System (EGS), i.e., geothermal energy systems utilizing supercritical carbon dioxide from a geothermal reservoir typically utilize the heat transferred from carbon dioxide to a second organic working fluid via a heat exchanger. The second organic working fluid will then evaporate to generate power through an expander. However, these system waste much of the energy through mechanical components.

As described in U.S. Pat. No. 6,668,554, to Donald W. Brown, "a binary heat transfer system method could be used to achieve superior thermodynamic efficiency, approximately a factor of three higher heat utilization rate than in a direct-expansion turbine method, particularly when carbon dioxide is the circulating supercritical fluid." However, this statement only stands true when the pure carbon dioxide is used. A numerical simulation done by the students of University of Incheon in Korea and Korea Institute of Machinery & Materials further showed that, even with the regenerator, the Stirling cycle solely using supercritical carbon dioxide can only achieve efficiency around 7.3%. Even when the heat source and condensation temperature is set to 700° C. and 40° C. respectively. Thus, it can be derived that a direct usage of single-species carbon dioxide may not favor the design of a power cycle for expansion machine in terms of lifting its efficiency with a heat source like geothermal reservoir. On the other hand, however, the organic Rankine cycle (ORC) for Enhanced Geothermal System using dual cycles, just like the proposal made by D. Brown, may not as efficient as it seems. According to the simulation done by researchers from Australia, E. Sauret and A. S. Rowlands had found out the efficiency of an ORC to be 9.51% and 10.43% when R143a and n-Pentane is used respectively at 413K, which may be appreciably less than the value estimated by D. Brown."

According to the state-of-art research, a fluid mixing process inside the chamber of an expansion machine which produce the shaft power of scroll expander will contribute to the increase of efficiency of the expander, based on the principle that for a single expansion component, isothermal expansion process can be more efficient than adiabatic expansion. This principle may be further extrapolated to be applied to other expansion machine like axial gas turbine, radial inflow turbine, Catherine Wheel, Euler Turbine, or other types of radial outflow reaction turbine. As has been mentioned by Woo Young Kim and other researchers' article, non-volatile liquids blended with non-condensable gas during the compression & expansion processes are able to contribute to the creation of an isothermal process, which has a higher efficiency than an adiabatic expansion process represented by single species expansion. As a result, a fluid mixing process is proposed to meet the goal of raising the efficiency of $CO_2$ based geothermal power generation system, by mixing the geofluid, which is the supercritical $CO_2$ and another working fluid, primarily those ones used in organic ranking cycle.

SUMMARY OF THE INVENTION

The invention is directed to a geothermal energy system comprising a Catherine Wheel that spins around an axle to produce power. A power generator may be coupled to the axle and as the axle spins, electrical power is generated. The Catherine Wheel has a plurality of wheel arms extending radially out from the axle. The wheel arms have a radial portion that extends radially out from an axle end and a fin portion, that extends from the radial portion at an offset angle to an exhaust end. A first working fluid, such as carbon dioxide from a geothermal reservoir, flows through an arm conduit within the wheel arm and second working fluid, such as a simple hydrocarbon, mixes with the first working fluid and both flow through a turbine. The turbine is configured within the arm conduit and it turns with the vaporization or expansion, in a supercritical state, of the combined working fluids. The spinning gas or supercritical fluid turbine imparts force to its previous compressor and forces the compressor to produce work on the supercritical carbon dioxide which flows through the arm conduit, raising its density and temperature. Power may be produced by the turbine and utilized in the system or may contribute to the power generated by the system.

The vaporized working fluids are expelled from the exhaust end of the wheel arms to produce thrust and propel the wheel arms about the axle. The first working fluid heats the second working fluid thereby aiding in the vaporization of the second working fluid. In an exemplary embodiment, the first working fluid is carbon dioxide from a geothermal reservoir and the second working fluid comprises a hydrocarbon.

An exemplary geothermal energy system comprises a Catherine Wheel comprising one or more wheel arms that spins around an axle and expels fluids into an exhaust ring. An exemplary Catherine Wheel comprises a plurality of wheel arms configured around an axle, wherein each of the plurality of wheel arms comprises a radial portion extending out from the axle and a fin portion that extends from the radial portion at an offset angle to an exhaust end, whereby the exhaust from the exhaust end propels the wheel arm about the axle. The fin portion may extend at an offset angle of about 90 degrees from the length axis of the radial portion to provide a force normal to the length of the radial portion, or a radial force.

In an exemplary embodiment, a turbine is configured within the wheel arm conduit, or arm conduit. A first working fluid flows through the arm conduit and into the turbine. A second working fluid is introduced into the turbine and the first working fluid and the second working fluid are mixed and vaporized within the turbine to form a vaporized working fluid that is expelled from the exhaust end of the wheel arm to propel the wheel arm and the Catherine wheel about the axle. In an exemplary embodiment, an electrical power generator is coupled with the Catherine Wheel to produce electrical power from the rotation of the Catherine Wheel or wheel arms about the axle. In an exemplary embodiment, a separator receives the vaporized working fluid, and collects the condensate of the said hydrocarbon. The collected condensate will then be atomized and injected back into the chamber of a compressor, and will be heated during the compression of carbon dioxide. Compression along will cause the temperature of carbon dioxide to rise. Thus, the heat generated during compression will be partially harvested by the hydrocarbon. After each time of the compression, the heated hydrocarbon will be condensed with a gas cooler or a thermoacoustic refrigeration device and the liquid hydrocarbon will be injected back into chamber of the said compressor atomized. When the compression is completed, all the hydrocarbon will be separated and pumped back into the storage tank. The first working fluid component, after being compressed, may be pumped back into the geothermal reservoir through an injection conduit or may be expelled or used for some secondary purpose. The second working fluid may be recirculated from a second fluid reservoir back to the Catherine Wheel. The heat generated during compression will be absorbed by a hydrocarbon, which will be readily available to have heat transfer with an outside heat source, such as hot, supercritical fluid from a geothermal reservoir. The first working fluid may be drawn from a geothermal reservoir, such through an extraction well. The first working fluid may comprise carbon dioxide and may consists substantially of carbon dioxide, wherein the fluid is at least about 90% carbon dioxide, or even at least about 95% carbon dioxide. The other component may be trace gases, or water vapor, for example. The second working fluid may be a hydrocarbon and may be an inorganic fluid under some special circumstances.

In an exemplary embodiment, the first working fluid heats the second working fluid. The first working fluid may be at supercritical state and may be compressed and/or heated in the wheel arm and may be heated to a given temperature and pressure before entering the turbine. The first working fluid component may be supercritical CO2 when introduced into the arm conduit or into the turbine. The second working fluid may comprise a hydrocarbon, such as simple hydrocarbon, including but not limited to, methane, ethane, propane, isobutane, pentane, hexane, heptane, octane, nonane and decane, for example. An exemplary hydrocarbon is propane which may mix with the supercritical CO2 and become a single phase, homogenous fluid, or vaporize in the wheel arm to a given vapor pressure, such as in the evaporator connected to a gas turbine and subsequently condensed back to a fluid in the condenser. The emergence of two-phase flow of the second working fluid will transfer heat to the carbon dioxide during its decompression and expansion. This will lower the polytropic index of the carbon dioxide, approximating the process to an isothermal one, thus help to lift the efficiency of the turbines and the Catherine Wheel. The second working fluid may flow through a second fluid delivery conduit to the wheel arm, or to the turbine. The second fluid delivery conduit may couple with the arm conduit at a second fluid inlet. The second fluid inlet may be configured at least 50% of the wheel arm length from the axle end of the wheel arm.

In an exemplary embodiment, the first working fluid will be mixed with a second working fluid in an ejector, jet pump, or a Venturi tube, for example. The second inlet of the working fluid may be configured on the throat of the said components. The temperature of the first working fluid, before mixing, should be no less than 80° C., and can be as high as 150° C. or more. But should be less than 250° C.

In an exemplary embodiment, a condenser is configured to receive the vaporized working fluids and the working fluids may be condensed and reformed back into the first and second working fluid components. The first working fluid may the returned to the geothermal reservoir through a return well conduit. The second working fluid maybe be returned to a second fluid reservoir and recirculated through the process.

In an exemplary embodiment, a compressor is, used to further compress the first working fluid. In addition, one or more heaters may be used to heat the first and/or second working fluid as they flow into or through the wheel arms. In an exemplary embodiment, a heater is configured to heat the first and/or second working fluid while it is flowing through the arm conduit, such as prior to introduction to the turbine. The first working fluid may be carbon dioxide and may be heated to be supercritical carbon dioxide, with a temperature range capable of boiling a second working fluid before introduction into the turbine, or dissolve the second working fluid into a homogenous, single phase fluid. The first working fluid may consist substantially of carbon dioxide, having no more than about 5% of other components, and preferably no more than about 2% other components.

The first working fluid may be obtained through an extraction conduit extending to a geothermal reservoir. The extraction conduit may produce an inlet flow of the first working fluid to the arm conduit of the Catherine Wheel. As described herein, the first working fluid may be returned to the geothermal reservoir through a return well conduit, or injection conduit.

The second working fluid may comprise a hydrocarbon such as propane, isobutane and ethanol, for example. These hydrocarbons may be saturated liquids with low vapor pressures. For isobutane the vapor pressure may be at least about 0.20 MPa, at least about 0.28 MPa, at least about 0.50 MPa, at least about 0.57 MPa, at least about 1 MPa, at least about 1.5 MPa, and preferably at 1.88 MPa. For propane the vapor pressure may be at least about 2.0 MPa, and preferably equal or larger than 2.111\4 Pa. The vapor pressure of the second working fluid may have any range between and including the vapor pressures provided, such as from about 0.75 MPa to about 2.0 MPa. In an exemplary embodiment, the second working fluid consists substantially of a hydrocarbon, having no more than about 5% of other components, and preferably no more than about 2% other components. In an exemplary embodiment, the second working fluid is propane.

The second working fluid may be introduced into the wheel arm some distance along the length of the wheel arm, such as just before the turbine or into the turbine. The second working fluid may flow through a second fluid delivery conduit that couples with the arm conduit at a second fluid inlet. Depending on the design strategy, the second fluid inlet may be configured about 50% or more of the wheel arm length from the axle end of the wheel arm.

The exemplary energy system employing the Catherine Wheel as described herein may be used to produce power, such as electrical power from the rotation of the wheel arms. The first and second working fluids may be combined and may flow through a turbine configured within a wheel arm conduit to propel the mixed fluids through and out of the wheel arm conduit. The force exerted by the exhaust of the mixed fluids propels the wheel arms about the axle, which spins. The spinning axle may propel a generator to produce power, such electrical power.

In an exemplary embodiment, a portion of the second working fluid component of the combine working fluid is condensed after exiting the Catherine Wheel and the liquid second fluid is then atomized and injected into the subsequent compressor. This curbs the sensible heat generation and lower the compression work, and reduce the polytropic index during the compression, thus greatly improves efficiency of the system.

An exemplary geothermal energy system is scaled for efficiency and for power production and therefore the diameter of the Catherine Wheel may be about 3 m or more, about 6 m or more, about 8 m or more, about 10 m or more, or even 12 m or more and any range between and including the diameters provided.

In an exemplary embodiment, the second working fluid is isobutane and the mix ratio of first working fluid, such as carbon dioxide, to the second working fluid, isobutane is about 3:1 or more, about 5:1 or more, about 6:1 or more and any range between and including the working fluid mix ratios provided. In an exemplary embodiment, the second working fluid is propane and the mix ratio of first working fluid, such as carbon dioxide, to the second working fluid, propane is about 4:1 or more, about 5:1 or more, about 6:1 or more and any range between and including the working fluid mix ratios provided. The working fluid mix ratio is the ratio of the mass flow rate or the molecules of first working fluid to the molecules of the second working fluid.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

FIG. 8 shows an exemplary wheel arm having a De Laval Nozzle, or a convergent subsonic nozzle, in the radial portion.

Figure 1:
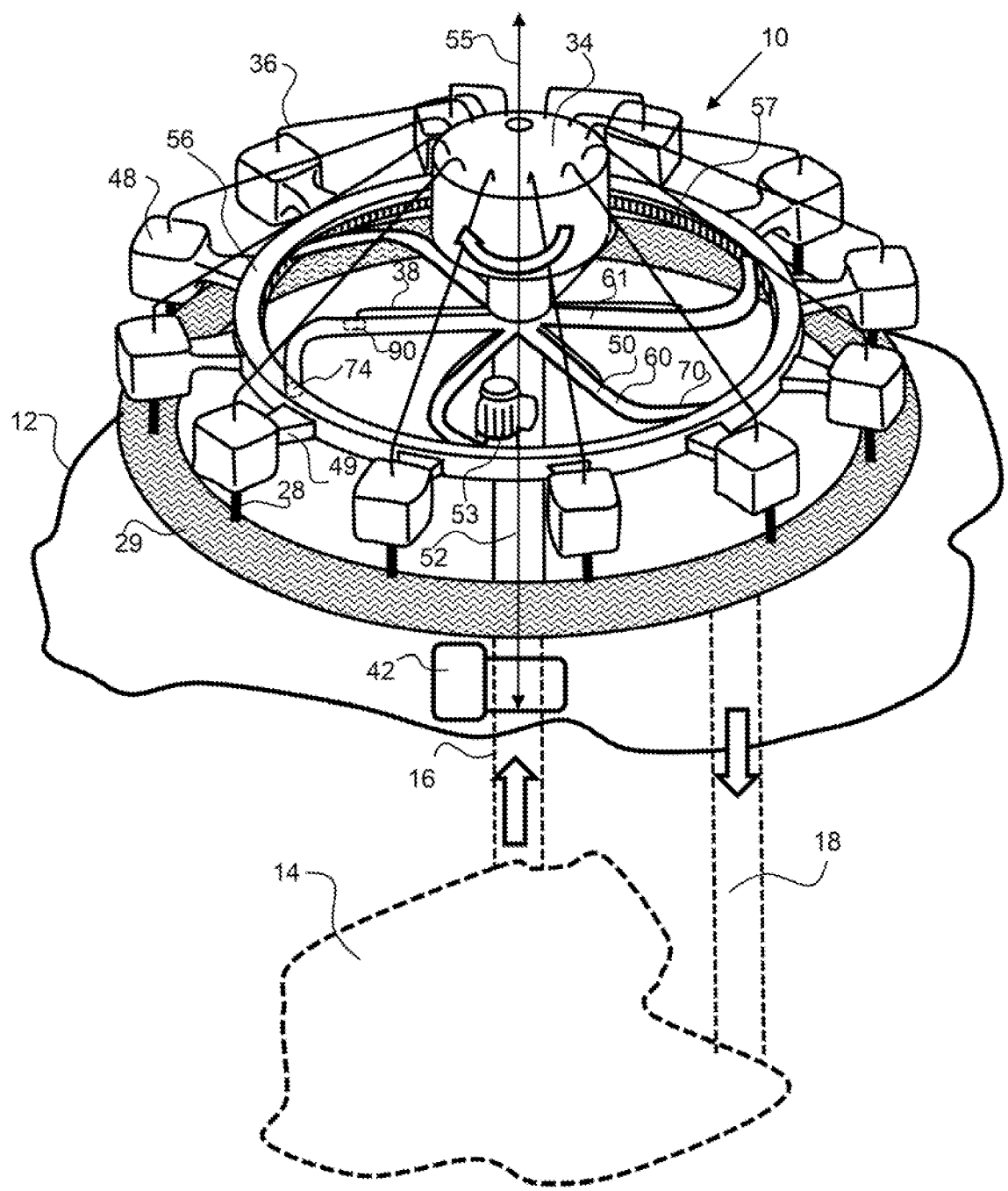
FIG. 1 shows a perspective view of exemplary geothermal energy system comprising a Catherine Wheel that spins to produce electricity.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 2:
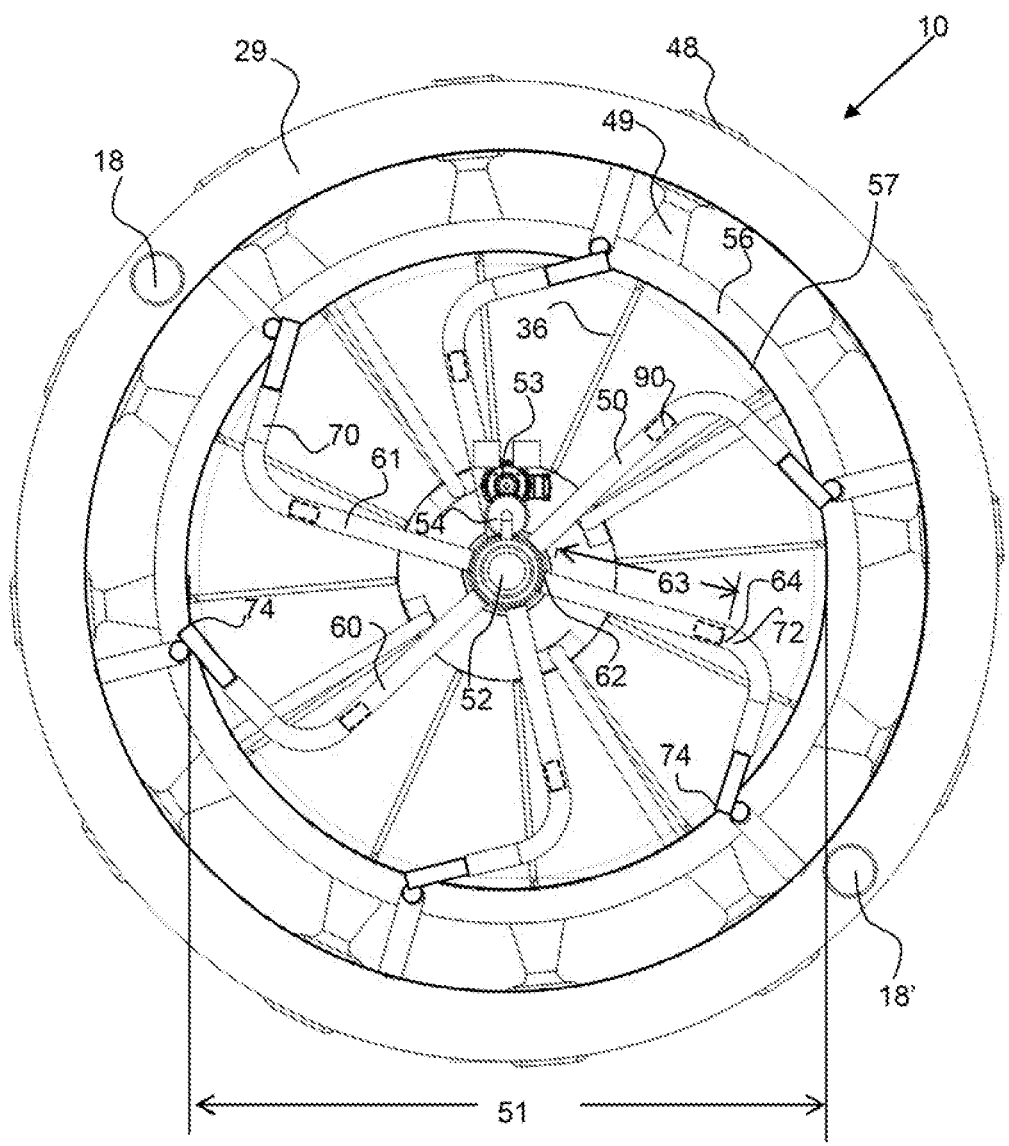
FIG. 2 shows a bottom view of exemplary geothermal energy system comprising a Catherine Wheel that spins to produce electricity.

Referring FIGS. 1 and 2, an exemplary geothermal energy system 10 comprises a Catherine Wheel 50 that spins about a rotational axis 55 to produce power in a generator 53 coupled thereto. The Catherine wheel comprises a plurality of wheel arms 60 that comprise an arm conduit 66 for the flow of a first working fluid comprising carbon dioxide extracted from an extraction well 16 coupled with a geothermal reservoir 14 which may be below ground 12. A second working fluid, such as a hydrocarbon is introduced into the arm conduit 66 through a second fluid delivery conduit 38, and the two working fluids then pass through a turbine 90. The two fluids vaporize, expand and are accelerated from the turbine unit to produce propulsion of the wheel arm as the working fluids flow out from the exhaust end of the wheel arm. The wheel arms have a radial portion 61 that extends radially from the axle 52 of the Catherine wheel, and a fin portion 70 that is at an offset angle to the radial portion. The first working fluid flows from the geothermal reservoir 14 through the extraction well conduit 14, and may be compressed by compressor 42 before being delivered to the wheel arms of the Catherine wheel. Note that the first working fluid, such as super-critical CO2 may be heated prior to deliver to the wheel arms. The second working fluid, such as a hydrocarbon flow from the second fluid container into the second fluid deliver conduits 38, extending along each of the wheel arms. The force of the working fluids flowing out from the exhaust end turns the Catherine wheel and a generator 53 coupled to the Catherine wheel axle 52, such as by one or more gears produces power. The expelled gasses from the exhaust end of the Catherine wheel is captured in the exhaust ring 56 and fed through a separator 49 to a cooler/condenser. The second working fluid is returned to the second working fluid container 34 through a return conduit 36 and the first working fluid flows through the first working fluid exhaust conduit 28 to the injection tube 29. The first working fluid flow from the injection tube 29 back to the geothermal reservoir through a return well conduit 18. In a real geothermal power plant application, the return well conduit and fluid extraction conduit may be hundreds of meters apart.

Figure 3:
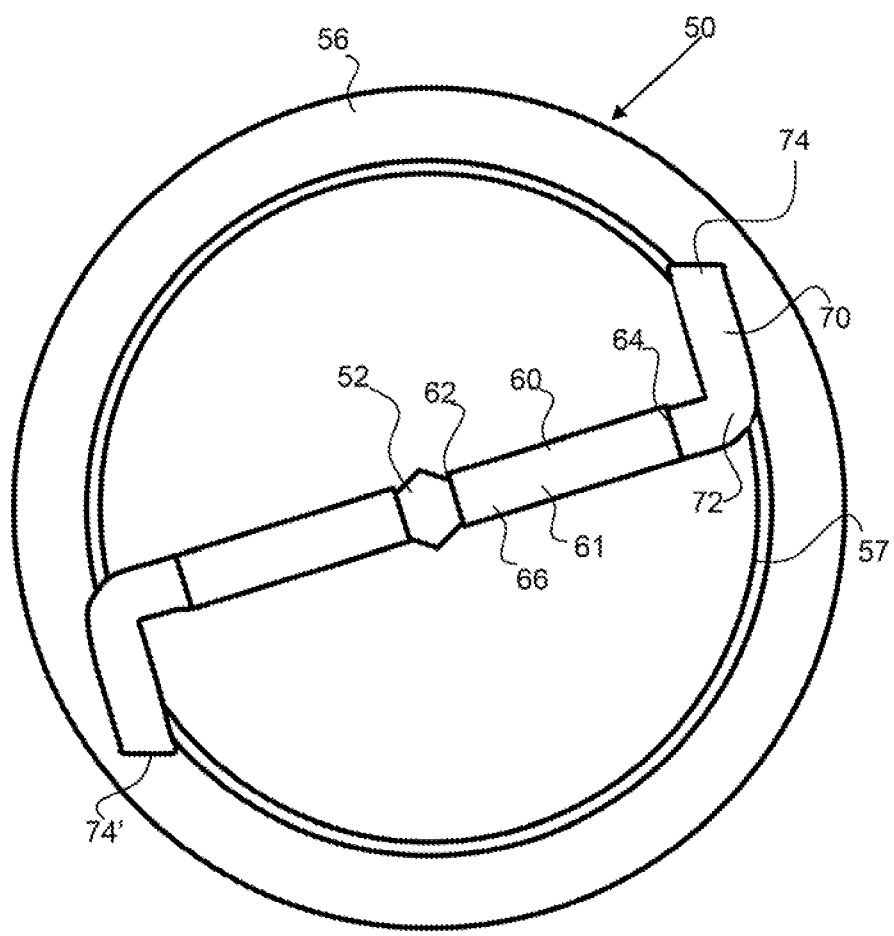
FIG. 3 shows a bottom view of a Catherine wheel and exhaust ring.
Figure 7:
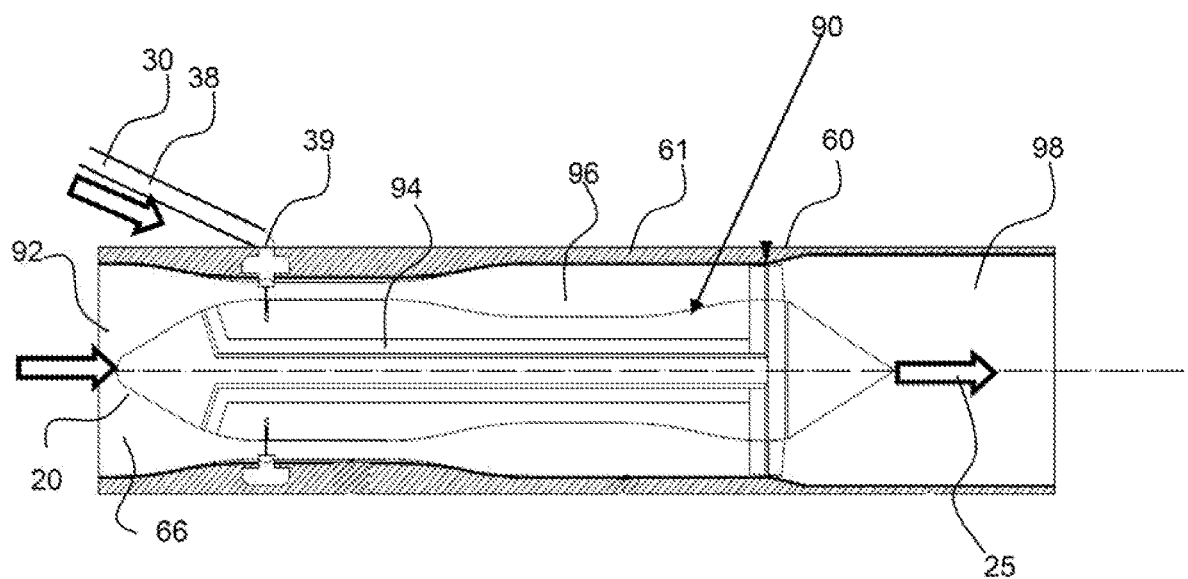
FIG. 7 shows a cross sectional view of an exemplary turbine having a mixing chamber, diffuser and evaporator combined in a single unit for vaporizing the first and second working fluids.

Referring to FIGS. 2 and 3, the wheel arms 60 have a radial portion 61 having a length 63 from an axle end 62 to the fin end 64, and a fin portion 70 having a length from the radial end to the exhaust end 74. The exhaust end may extend into the exhaust ring 56 and a dynamic seal 57 may seal around the wheel arm as it rotates within the exhaust ring. The radial portions 61 are designed in symmetry in order to cancel the centrifugal force, imparted on the embedded turbine units as shown in FIG. 7, by the spinning Catherine Wheel 50 and reduce the vibration. The increased plurality of wheel arms aid in the reduction of the vibration and stabilize the system. The Catherine wheel 50 has a diameter 51 that may be large as described herein. FIG. 3 shows a bottom view of a Catherine wheel 50 configured to exhaust into an exhaust ring 56. The wheel arm 60 has a radial portion that extends from an axel end 62 to an exhaust fin end 64. The wheel arm then turns to a fin portion 70 extending from the radial end 72 to the exhaust end 74. The exhaust end expels fluid into the exhaust ring 56. The wheel arm extends into the exhaust ring and stay strictly airtight with the space inside the ring slot. Thus, the tubes and nozzles very close to the ends of arms form a connecting vessel with the ring, from which there would be a successive pressure drops all the way from the mixing chamber to the exhaust ring.

Figure 4:
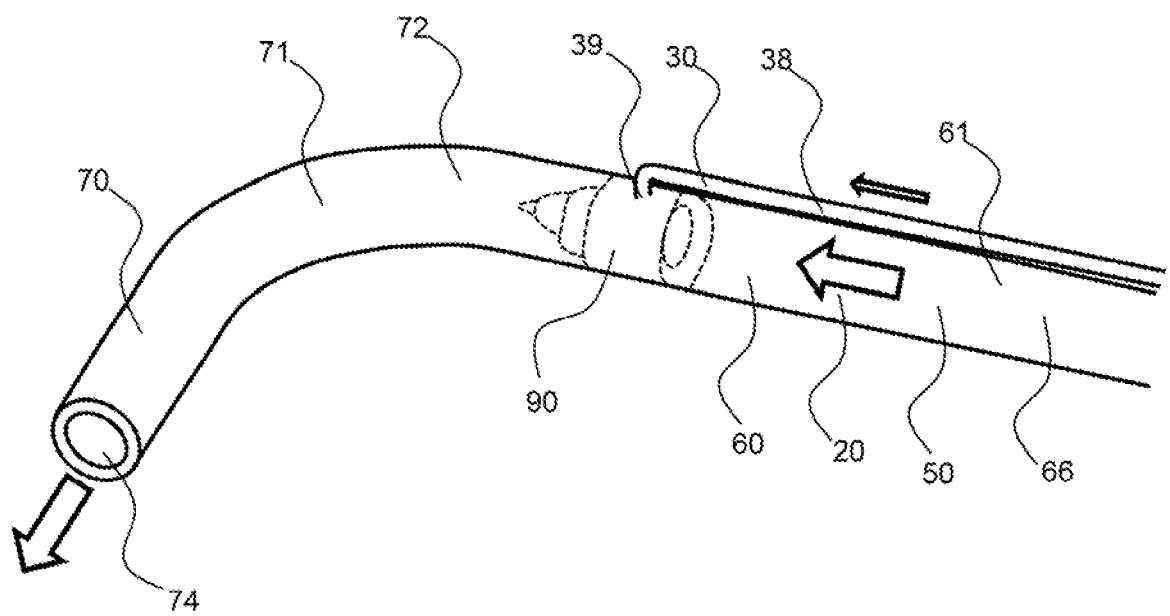
FIG. 4 shows a perspective view of a wheel arm having an arm conduit for a first working fluid comprising carbon dioxide extracted from the geothermal reservoir and a second fluid deliver conduit for injecting the second working fluid into the arm conduit for deliver to the turbine.

As shown in FIG. 4, an exemplary wheel arm 60 has an arm conduit 66 for a first working fluid 20 comprising carbon dioxide extracted from the geothermal reservoir and a second fluid deliver conduit 38 for injecting the second working fluid 30 into the arm conduit through the second fluid inlet 39, for deliver to the turbine 90. The two working fluids are vaporized in the turbine and are accelerated out from the exhaust end 74 of the fin portion 70 of the wheel arm. The turbine is located near the end of the radial portion 61 of the wheel arm, just before the radial end 72, or the curved portion 71 between the radial portion 61 and the fin portion 70. In an exemplary embodiment, supercritical carbon dioxide is mixed with the saturated liquid of the second working fluid. The second working fluid boils through contact with the supercritical carbon dioxide and both expand and vaporize. This step will be assisted by reheating, with the compression work generated by the gas turbine, or an electric heater powered by the electric motor embedded in the gas turbine. The combined vapor of the combined first and second working fluids drives the compressor to increase the enthalpy of the first working fluid, and thus the total enthalpy of the subsequent combined working fluid. The remaining high velocity expulsion of the combined working fluids from the exhaust end of the wheel arms, spins the Catherine wheel to produce electricity.

Figure 5:
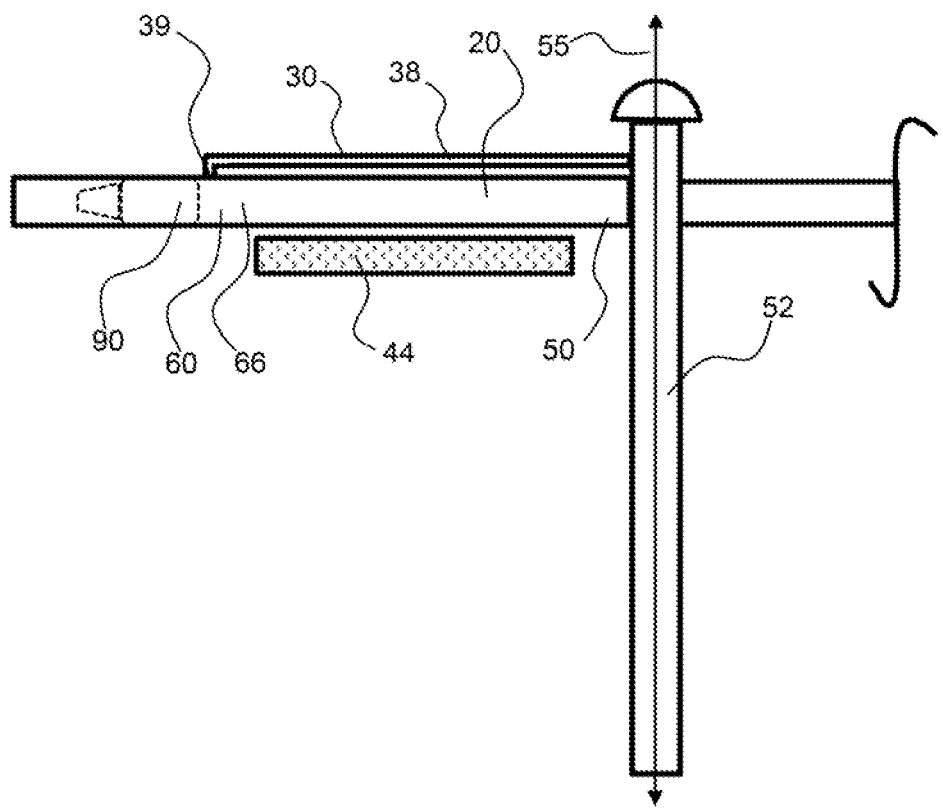
FIG. 5 show a side view of a portion of an exemplary Catherine wheel having a heater configured to heat the first working fluid as it passes through the arm conduit.

As shown in FIG. 5, an exemplary Catherine wheel 50 has a heater 44 configured to heat the first working fluid 20 as it passes through the arm conduit 66.

Figure 6:
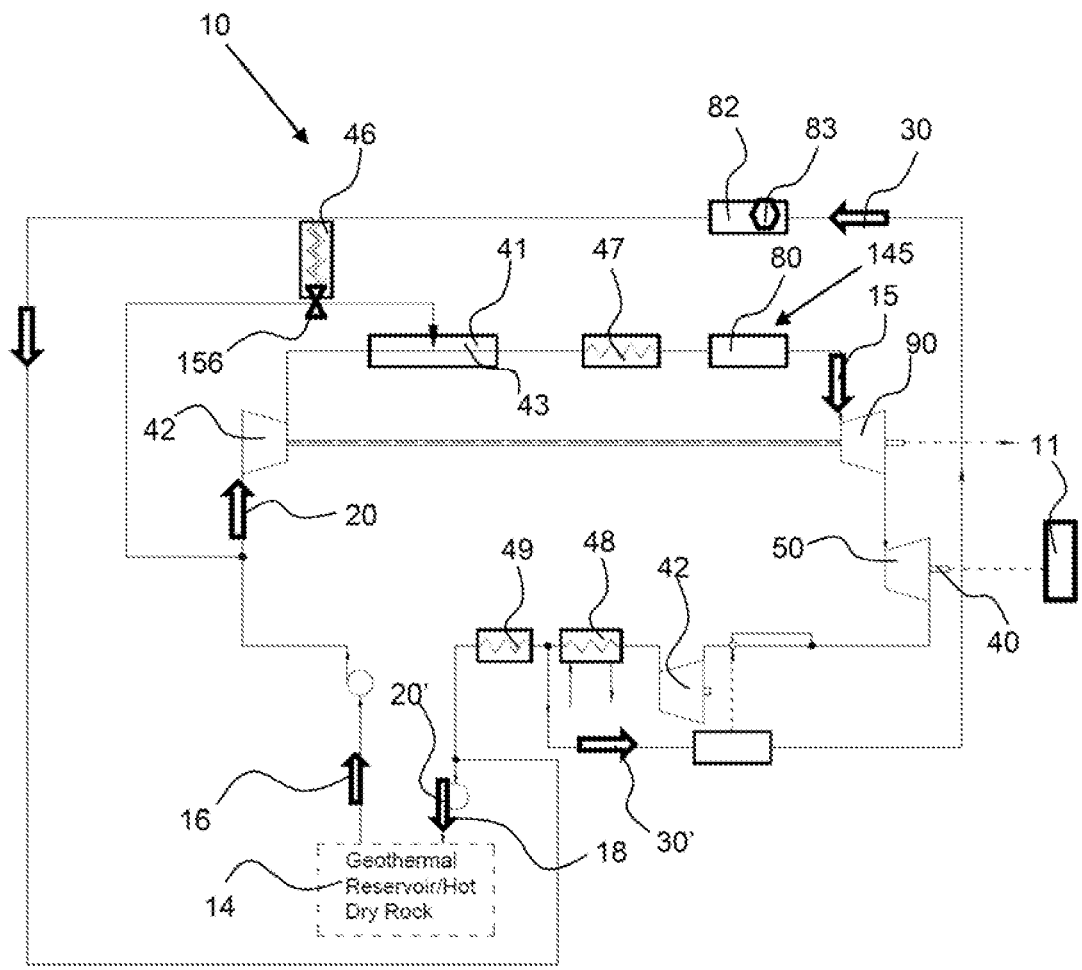
FIG. 6 show a schematic of an exemplary geothermal energy system comprising a Catherine wheel.

As shown in FIG. 6, an exemplary geothermal energy system 10 comprises a Catherine wheel 50 that spins or rotates about an axis to produce energy by a generator 40. A flow of a first working fluid 20 comprising carbon dioxide extracted through an extraction well 16 connected with a geothermal reservoir 14 and is compressed in a compressor 42. The compressed first working fluid is then mixed with a second working fluid 30 in a mixing chamber 41, which is configured in an ejector or jet pump, which may comprise a heating device 43 to control the temperature of the mixed fluids. The second working fluid may also be heated with a heat exchanger. A valve 156 may regulate the flow of the second working fluid into the mixing chamber 41. The mixed second working fluid 30 and first working fluid 20 are vaporized or evaporated in an evaporation section 145 to produce a vaporized working fluid or supercritical fluid mixture 15, which is then passed through a turbine 90 and out of the exhaust end of the wheel arm 60. The two fluids pass from the mixing chamber 41, through a diffuser 47 and an evaporator 80. Note that the mixing chamber, diffuser and evaporator maybe configured in a single unit or device. The mixed fluids then flow to a turbine and subsequently out of the exhaust end of a Catherine Wheel 50. As described herein, the turbine may be configured in the wheel arm of the Catherine Wheel. The rotating Catherine Wheel accelerates the vaporized working fluids and they are then compressed in a compressor 42 and then cooled and/or condensed in a condenser 48 and further condensed and finally separated by a separator 49. 'The second working fluid 30' is returned to a second working fluid reservoir 82 and recirculated through the system. The first working fluid 20' flows back to the geothermal reservoir 14 through a return well conduit 18. Energy produced by the geothermal energy system 10 may be stored in an energy storage device 11, such as a Vanadium Redox Flow Cell or rechargeable Battery. A power generator 40, such as an A.C. generator, may also be coupled to the energy storage device to produce electrical power. The power may be generated by the rotation of the wheel.

As shown in FIG. 7, an exemplary turbine 90 is configured to receive and vaporize the first working fluid 20 and second working fluid 30. The first working fluid 20 flows through the arm conduit 66 of the wheel arm 60 and into the inlet 92 of the turbine 90. The turbine is configured within the arm conduit 66. The second working fluid 30 flows through a second fluid delivery conduit 38 and into the turbine 90. The two working fluids mix and flow through the mixing chamber 94 and are diffused in the diffuser 96, at the end of which they were vaporized, wherein the vaporized working fluids 25 accelerate out of the exhaust 98 of the turbine.

As shown in FIG. 8, a De Laval Nozzle 120, or a convergent subsonic nozzle, is shown by the constriction in the pipe section. The nozzle of the arm conduit of Catherine Wheel can be a De Laval Nozzle, if the mass flow rate is sufficient. A very constricted section may be applied to the design if multi-stage expansion and cooling of the combined working fluid is considered as an important priority.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A method of producing energy comprising the steps of:
   a) providing a geothermal energy system comprising:
      i) a Catherine Wheel that spins around an axle and comprising:
         a plurality of wheel arms configured around an axle, wherein each of the plurality of wheel arms comprises:
            a radial portion
            a fin portion,
         wherein the radial portion extends radially out from an axle end and wherein the fin portion extends from the radial portion at an offset angle to an exhaust end
         an arm conduit extending within the wheel arm to said exhaust end;
         a turbine positioned within the arm conduit;
      ii) an electrical power generator coupled with the Catherine Wheel;
      iii) a compressor;
      iv) a condenser unit with a separator, a collector and gas coolers;
   b) flowing a first working fluid through the arm conduit and into said turbine;
   c) flowing a second working fluid into said turbine, and wherein the first working fluid and the second working fluid are mixed and are vaporized within the turbine to form a vaporized working fluid that is expelled from the exhaust end of the wheel arm to propel the wheel arm and the Catherine wheel about the axle;
      wherein the first working fluid heats the second working fluid;
   d) condensing the vaporized working fluid in the condenser to reform the first and the second working fluid;
   e) producing electrical power with the electrical power generator when the Catherine wheel spins about the axle.

2. The method of producing energy of claim 1, wherein the first working fluid is heated before flowing into the turbine.

3. The method of producing energy of claim 2, wherein the first working fluid is heated in the wheel arm.

4. The method of producing energy of claim 2, wherein the first working fluid is heated to a supercritical state before being introduced into the turbine.

5. The method of producing energy of claim 1, wherein the second working fluid is recirculated from the condenser back to the Catherine Wheel.

6. The method of producing energy of claim 1, further comprising an extraction conduit extending from a geothermal reservoir that produces an inlet flow of the first working fluid component to the arm conduit of the Catherine Wheel.

7. The method of producing energy of claim 6, further comprising an injection conduit extending into said geothermal reservoir to produce an outlet flow of said first working fluid component back into the geothermal reservoir.

8. The method of producing energy of claim 1, wherein the second working fluid is recirculated from the condenser to a second fluid reservoir.

9. The method of producing energy of claim 8, wherein the second working fluid component of the vaporized working fluid is condensed to a liquid and wherein said liquid is atomized and injected into a compressor to improve efficiency of said compressor.

10. The method of producing energy of claim 1, wherein the first working fluid component comprises carbon dioxide.

11. The method of producing energy of claim 1, wherein the first working fluid component is supercritical CO2 when introduced into the arm conduit.

12. The method of producing energy of claim 1, wherein the second working fluid comprises a hydrocarbon having a vapor pressure of at least 0.75 MPa.

13. The method of producing energy of claim 12, wherein the second working fluid is propane.

14. The method of producing energy of claim 13, wherein the vaporized working fluid has a working fluid mix ratio of first working fluid to second working fluid of at least 4 to 1.

15. The method of producing energy of claim 12, wherein the second working fluid is isobutane.

16. The method of producing energy of claim 13, wherein the vaporized working fluid has a working fluid mix ratio of first working fluid to second working fluid of at least 3 to 1.

17. The method of producing energy of claim 1, wherein the second working fluid flows through a second fluid delivery conduit and wherein the second fluid delivery conduit couples with the arm conduit at a second fluid inlet.

18. The method of producing energy of claim 17, wherein the second fluid inlet is configured at least 50% of the wheel arm length from the axle end of the wheel arm.

19. The method of producing energy of claim 1, wherein the Catherine Wheel has a diameter of at least 3 meters.

* * * * *